United States Patent
Smith

[11] 3,966,143
[45] June 29, 1976

[54] SELF-LAUNCHING GLIDER

[76] Inventor: Gordon R. Smith, 4 Summit Terrace, Sparta, N.J. 07871

[22] Filed: Jan. 28, 1974

[21] Appl. No.: 437,187

Related U.S. Application Data

[63] Continuation of Ser. No. 351,997, April 17, 1973, abandoned.

[52] U.S. Cl. ................................ 244/16; 114/39; 114/66.5 H; 244/106
[51] Int. Cl.² .................. B64C 31/02; B63B 35/72
[58] Field of Search ............ 244/16, 105, 106, 45 A, 244/123; 114/66.5 R, 66.5 H, 39

[56] References Cited
UNITED STATES PATENTS

| | | | |
|---|---|---|---|
| 1,720,698 | 7/1929 | Staiger | 244/105 |
| 2,681,776 | 6/1954 | Howard | 244/45 A |
| 2,747,816 | 5/1956 | Howard | 244/45 A |
| 3,106,373 | 10/1963 | Bain et al. | 244/123 X |
| 3,473,761 | 10/1969 | Chutter | 244/123 X |
| 3,599,903 | 8/1971 | Handler | 244/105 X |
| 3,636,906 | 1/1972 | Wray | 114/66.5 R |
| 3,742,890 | 7/1973 | Hubbard et al. | 114/66.5 H |
| 3,800,724 | 4/1974 | Tracy | 114/66.5 H |

*Primary Examiner*—Duane A. Reger
*Assistant Examiner*—Barry L. Kelmachter
*Attorney, Agent, or Firm*—Lerner, David, Littenberg & Samuel

[57] ABSTRACT

An aircraft of variable geometry and certain unique features which allow its operation along the surface of water, ice or the ground under sail power provided by tilting the wings up into a cross-wind to attain sufficient speed to be self launched into gliding flight in two modes — while close to the surface in wind shear, circling and climbing in a regenerative flight path powered by changes in wind speed with altitude until sufficient altitude is attained to soar on rising air currents.

37 Claims, 40 Drawing Figures

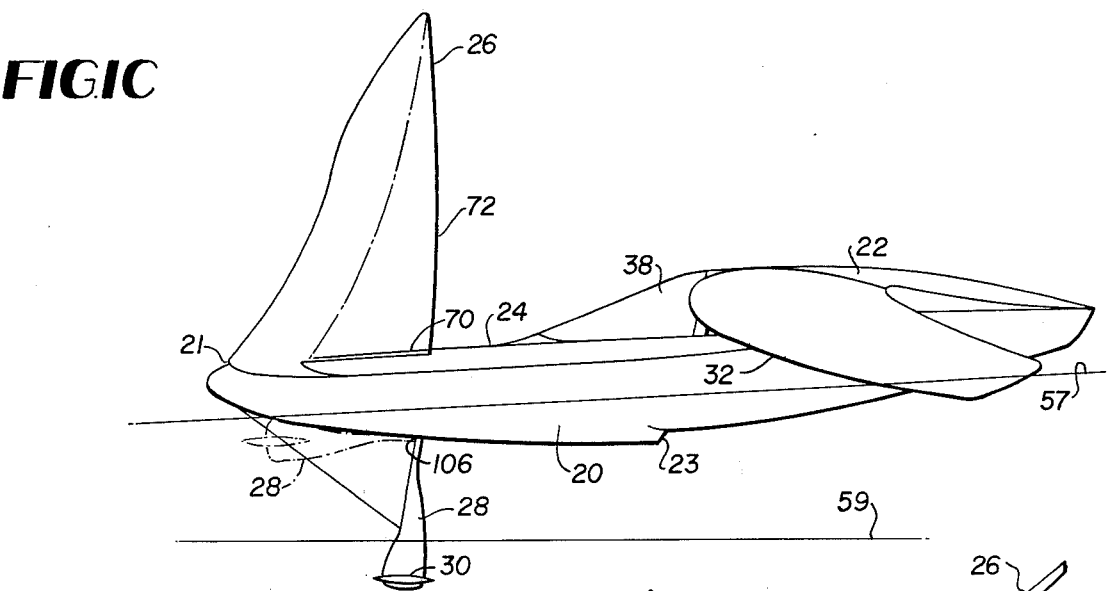
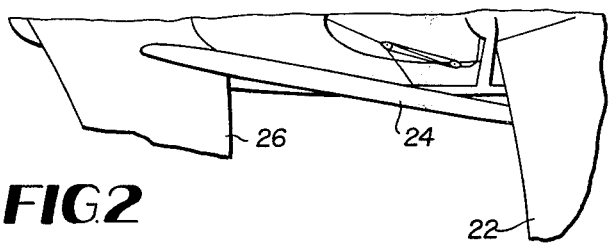
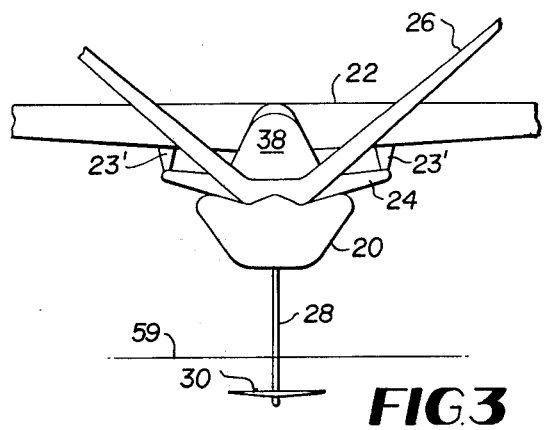
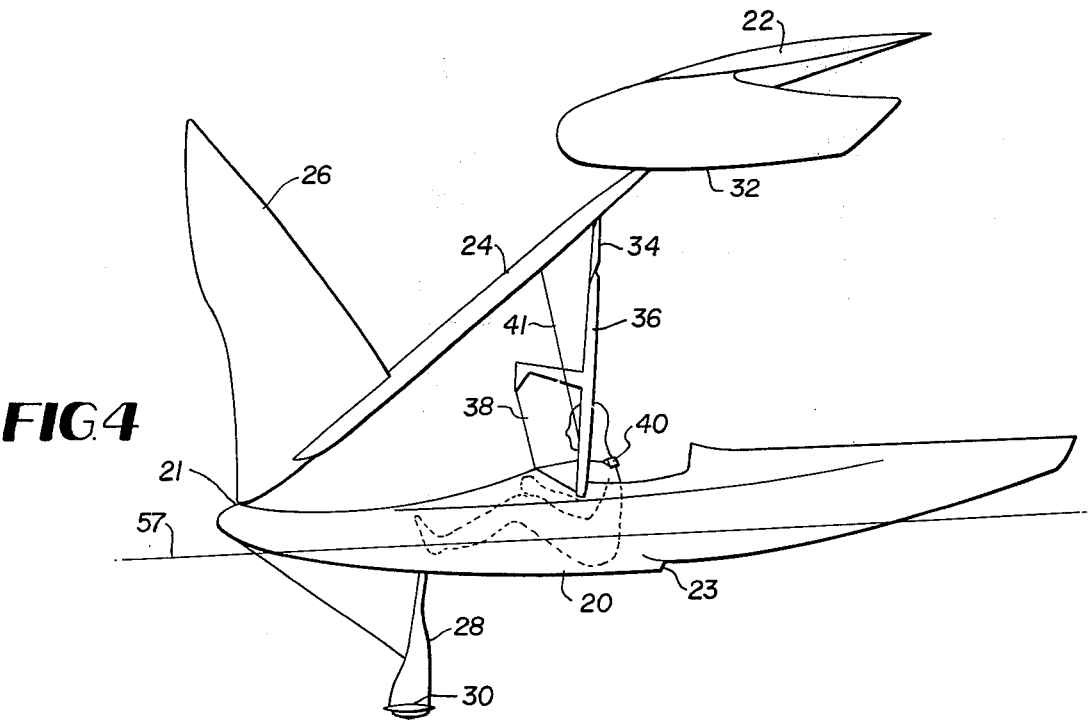

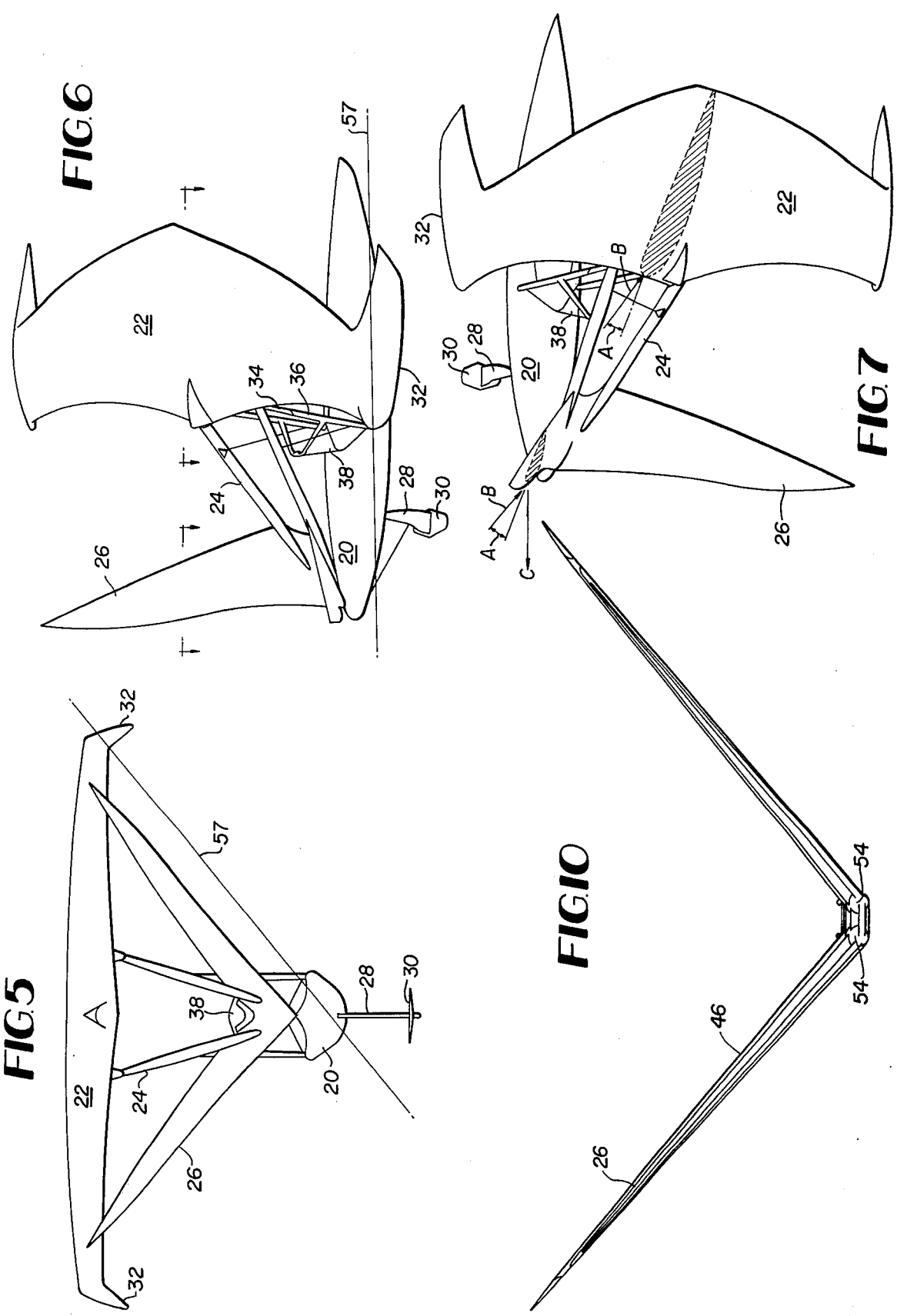

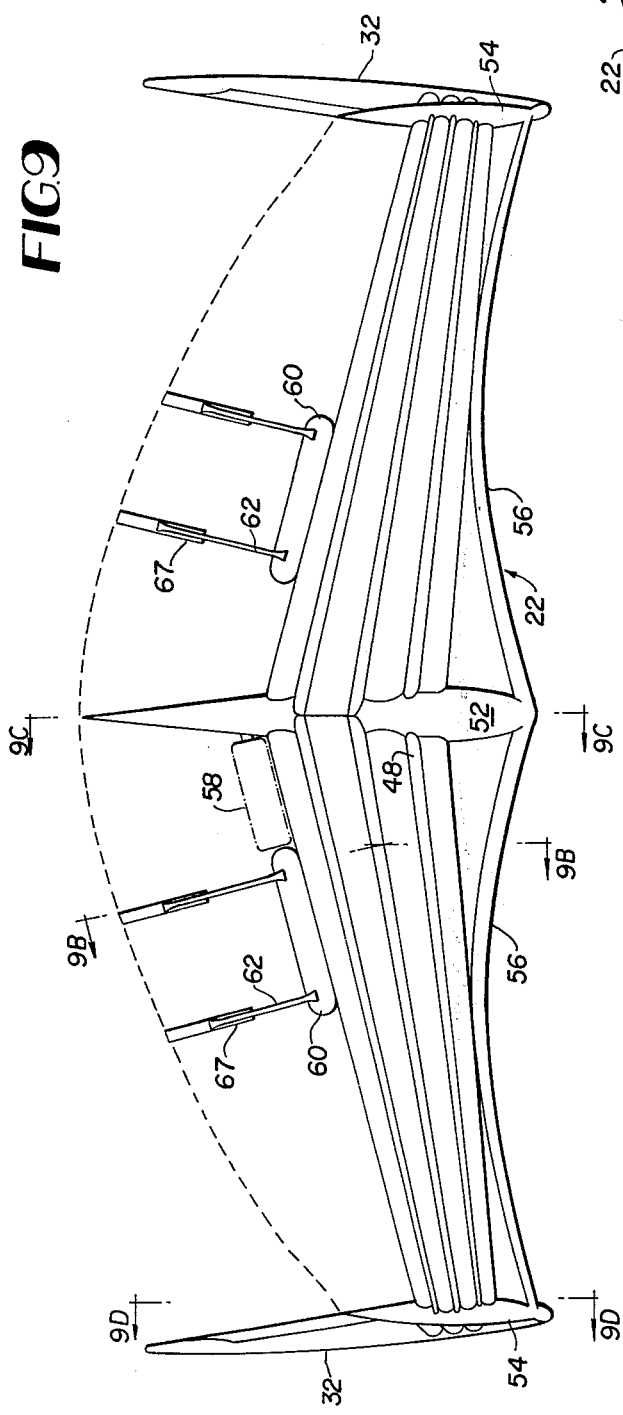

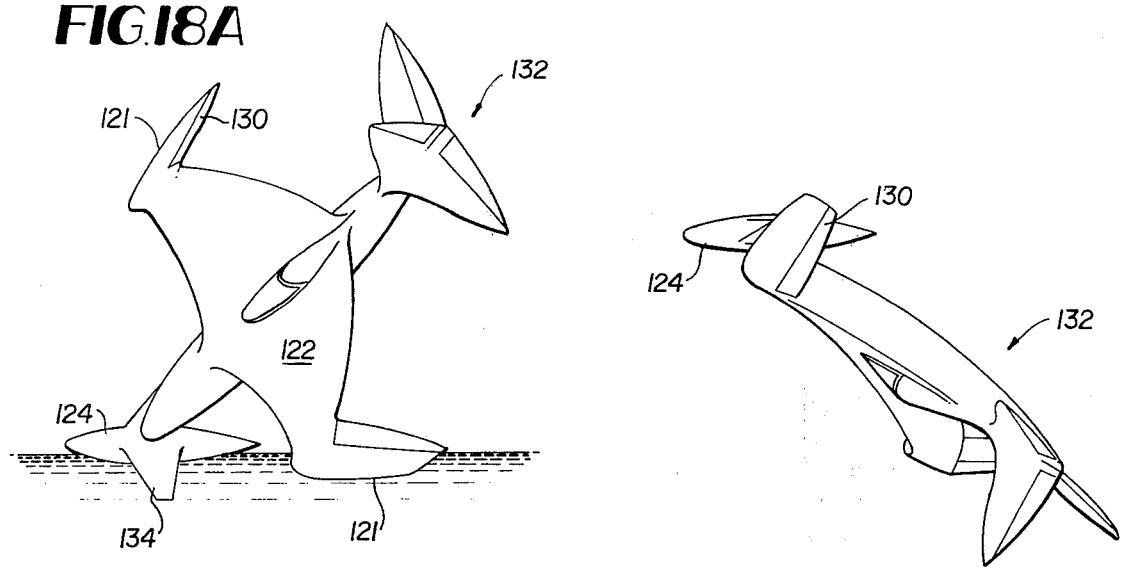
FIG.18A
FIG.18B
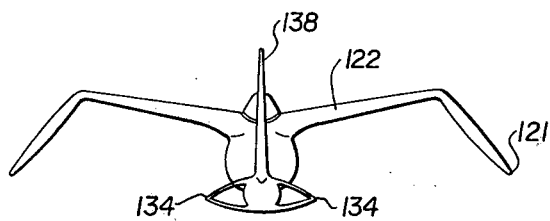
FIG.19
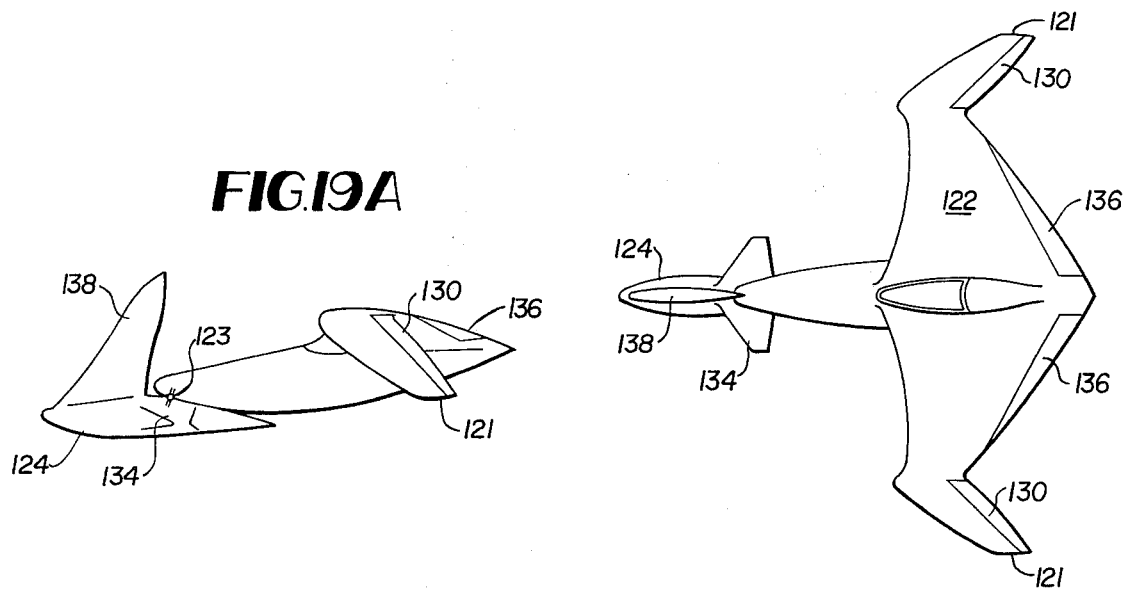
FIG.19A
FIG.19B

SELF-LAUNCHING GLIDER

This is a continuation of application Ser. No. 351,997 filed Apr. 17, 1973, now abandoned.

This invention relates generally to aircraft and more particularly to an amphibious glider having a fuselage type displacement hull for gliding along the surface of water on its step powered by the action of the wind acting on a forwardly placed high dihedral canard wing and a rearwardly positioned main wing.

The main object of the present invention is to provide an amphibious glider of the type described which is provided with a hydrofoil foot to act as a rudder and to enable the hull to glide along above the surface of the water.

An important object of the present invention is to provide an amphibious glider of the type described which may soar in the air above the surface of the water with its hydrofoil retracted against the hull.

Another important object of the present invention is to provide an amphibious glider of the type described in which the canard and main wings may be pivoted upwardly about a forward hinge point to provide a maximum driving force on an optimum heading (70° off the true wind direction).

A further important object of the present invention is to provide an amphibious glider of the type described in which the main wing tips depend downwardly to function as keels and pontoons.

A still further important object of the present invention is to provide an amphibious glider of the type described in which the wings are formed of inflatable materials including the lateral control members, for ease in storage of the glider.

Another important object of the present invention is to provide an amphibious glider of the type described which has a fuselage type displacement hull with gunwale clearance to permit a lateral roll of 40° and a stepped bottom surface to release adhesion of the stern wave.

Other objects and advantages of the present invention will become apparent during the course of the following description.

In the drawings, I have shown several embodiments of the invention. In these showings:

Figure 8:
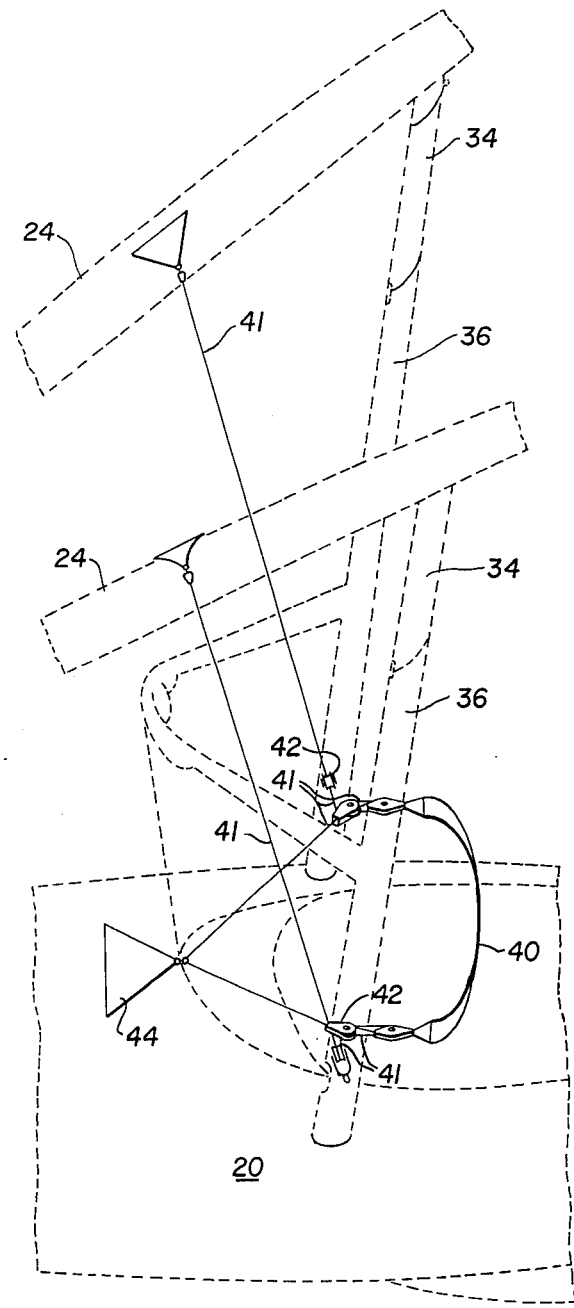
Figure 11:
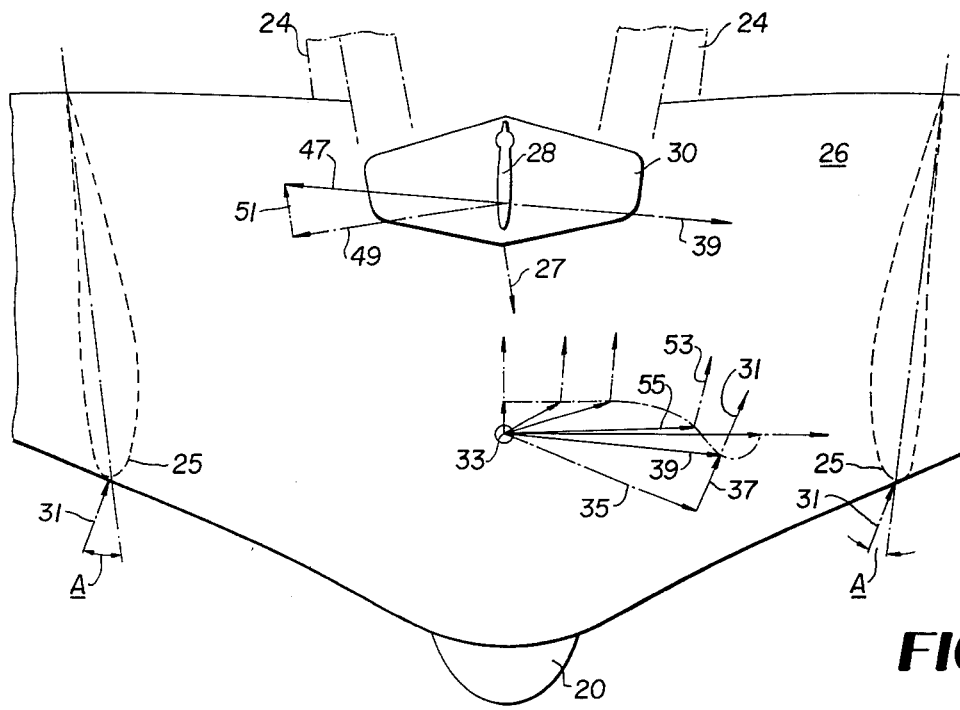
Figure 12:
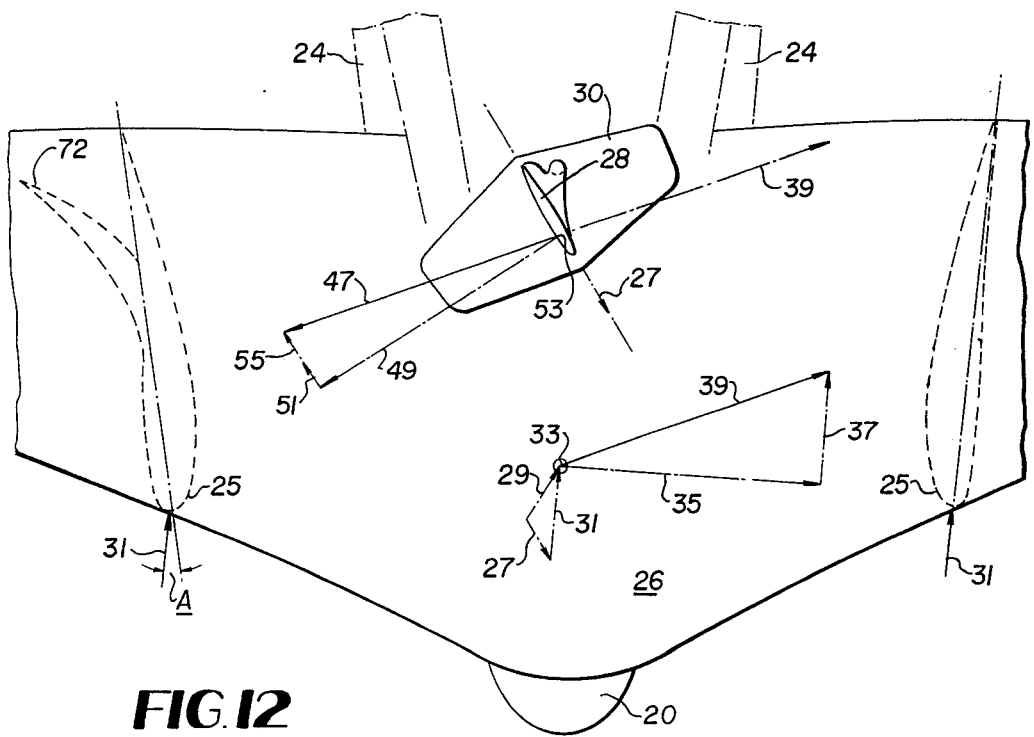
Figure 13:
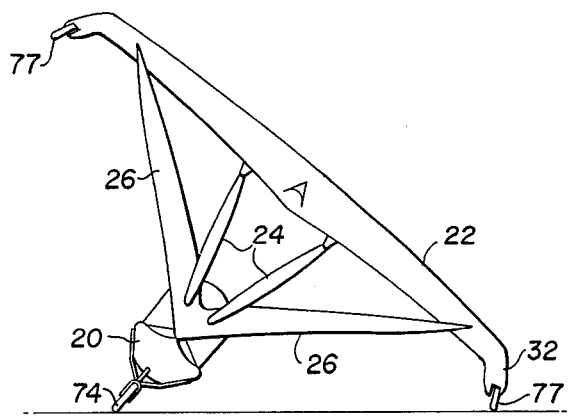
Figure 13A:
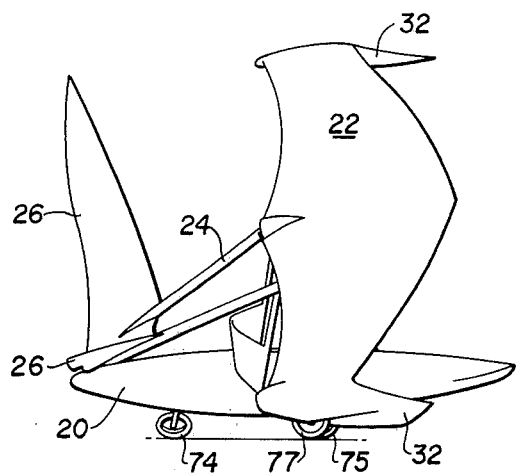
Figure 14:
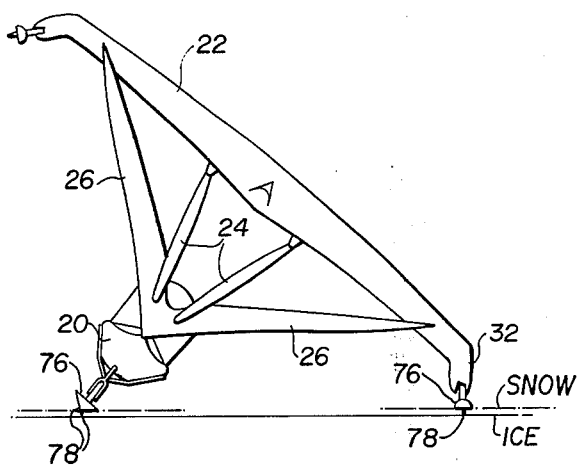
Figure 14A:
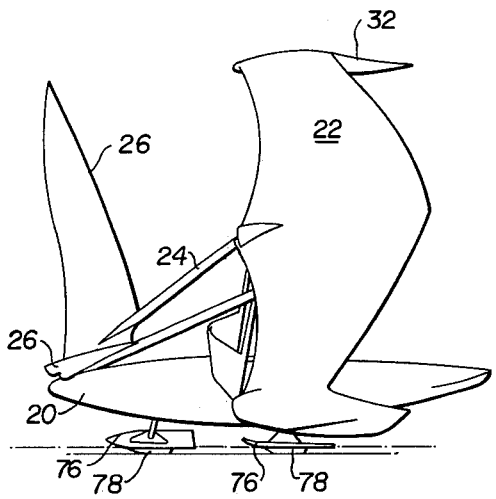
Figure 15:
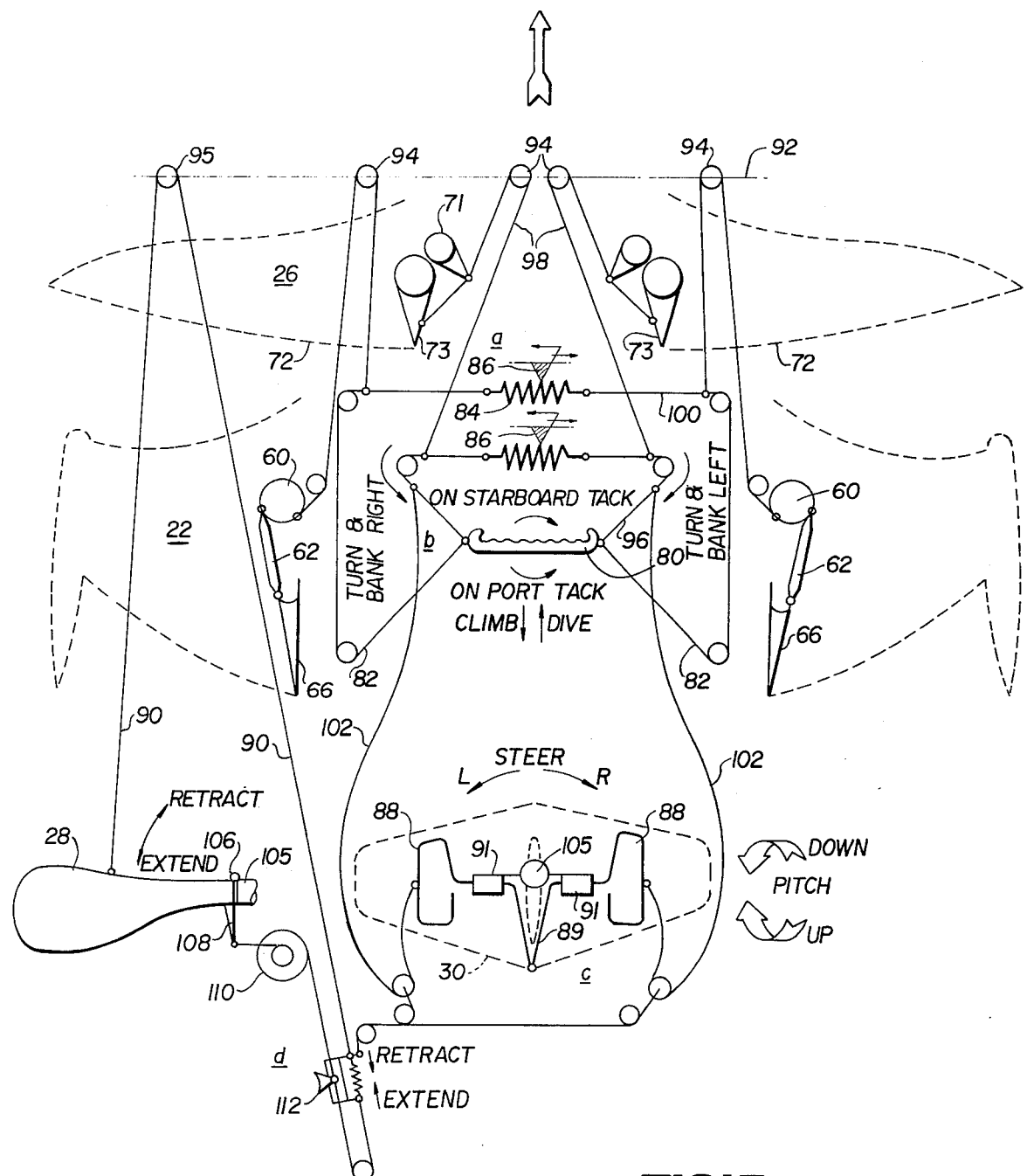
Figure 16:
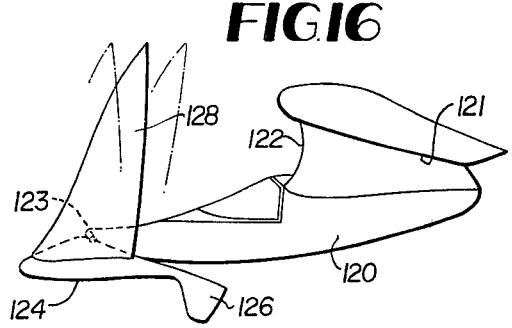
Figure 16A:
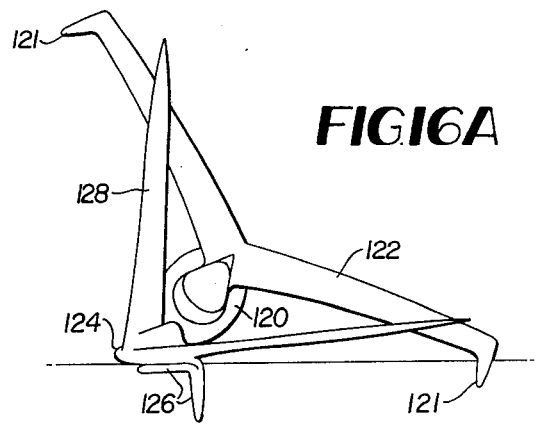
Figure 16B:
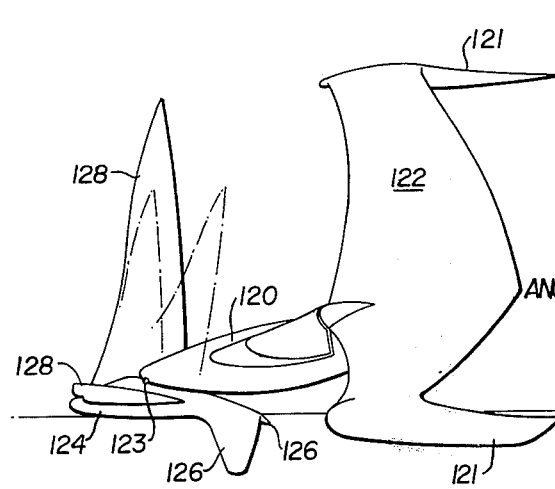
Figure 16C:
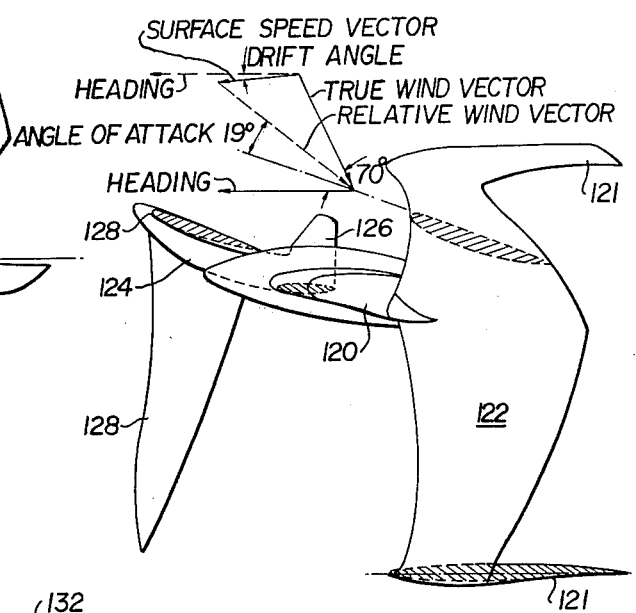
Figure 18:
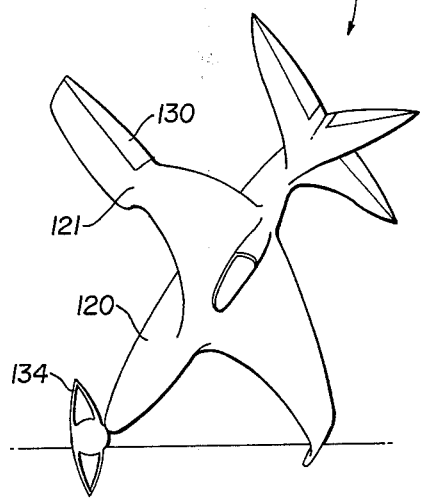
Figure 17:
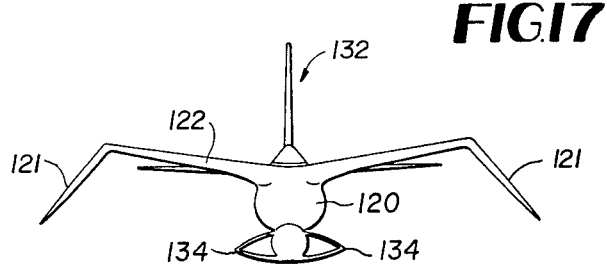
Figure 17B:
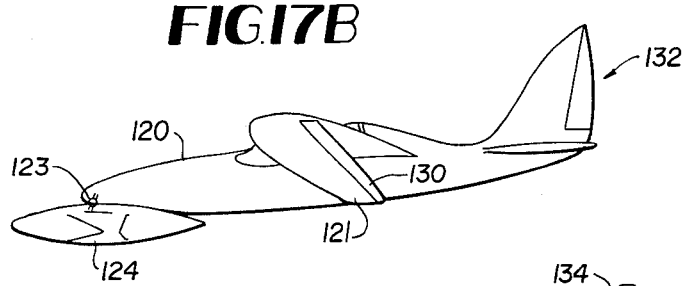
Figure 17A:
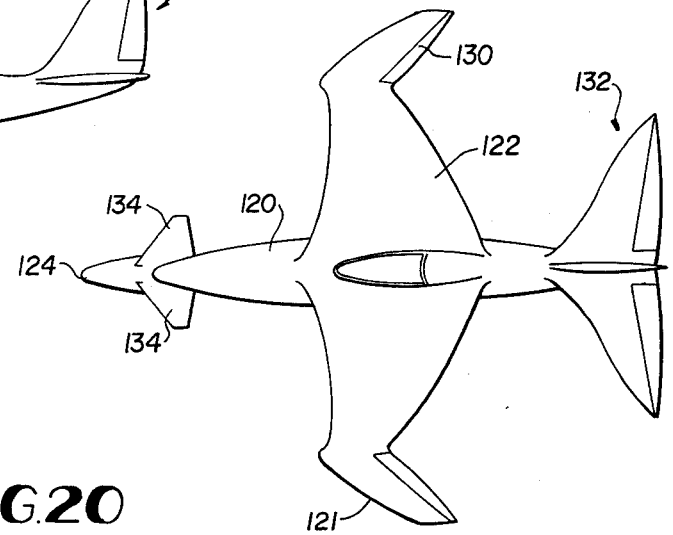
Figure 20:
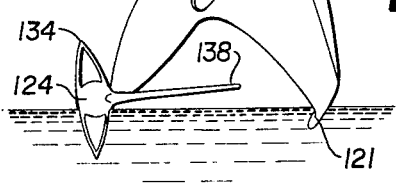
Figure 20B:
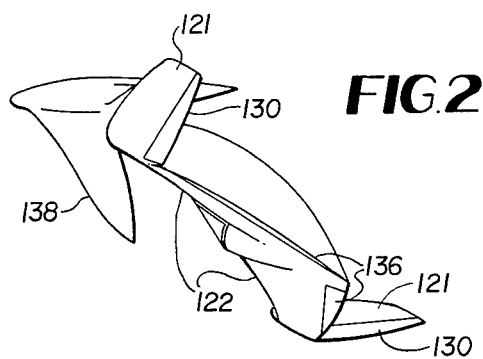
Figure 20A:
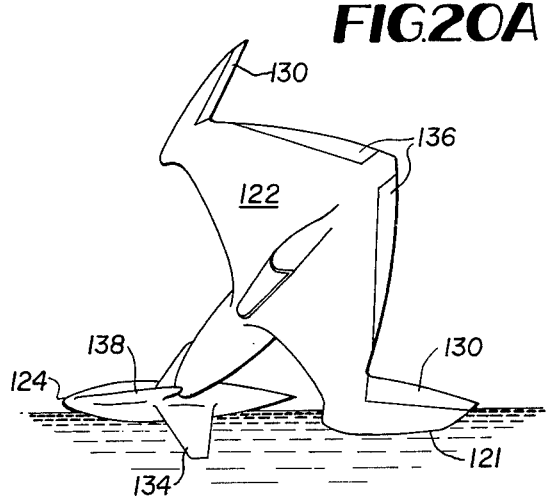

FIG. 1C is a side elevational view of the closed glider on the water surface and riding on the hydrofoil foot which is retractable forwardly and upwardly as shown in dotted lines (for soaring and for reentry of the hull), and showing the laterally projected area of the canard wing which results from its large dihedral and provides sufficient area for sail power when the craft is level as shown and for lateral aerodynamic control (rudder control in conventional aircraft);

FIG. 2 is a fragmentary left half plan view thereof showing one of the two tubular supports that connect the canard and main wing;

FIG. 3 is a fragmentary front elevational view thereof showing the dihedral of the canard wing and the edgewise planes of the hydrofoil assembly which is pivotable about its vertical stem for lateral control in the water with its horizontal plane being independently pivotable on its horizonral axis to control its depth of immersion;

FIG. 4 is a side elevational view of the opened glider on the surface with the canard and main wings raised about their forward pivot showing the seated pilot ready to retract the wings, and the glider poised ready to tilt sideways onto either wing tip pontoon;

FIG. 5 is a front elevational view thereof with the water line showing the left tilt equilibrium attitude;

FIG. 6 is a side elevational view thereof with the left main wing tip pontoon fully immersed (as if under maximum rolling force) in which attitude the pontoon stabilizes the glider like an outrigger float stabilizes a canoe and, by cutting deeply into the water, develops keel forces to react sail forces on the main wing;

FIG. 7 is a top view thereof with section planes through the canard and main wings developed to show the resultant angle of attack of the wings when the glider is on an optimum heading;

FIG. 8 is a sketch to an enlarged scale of the control cables, pulleys, etc. superimposed on the dotted outline of the glider which effect retraction of the wings when the pilot leans forcefully rearward into a reclining position;

FIG. 9 is a top plan view of the light weight inflatable main wing structure and controls of polyester film which form an integral bladder assembly with its connecting air passages and is covered with a separate replaceable cover of the same material which is secured by a lacing system;

FIG. 9A is a front elevational view thereof;

FIG. 9B is a vertical sectional view thereof taken on the line 9B—9B of FIG. 9;

FIG. 9C is a vertical sectional view thereof taken on the line 9C—9C of FIG. 9;

FIG. 9D is a vertical sectional view thereof taken on the line 9D—9D of FIG. 9;

FIG. 10 is a front elevational view of the inflatable canard wing which is formed similarly to the main wing;

FIG. 11 is a fragmentary, diagrammatic plan view of the glider at the canard wing which is shown deleted in part to reveal the direction of the hydrofoil and show the resolution of principal force and velocity vectors that act on the canard wing and the hydrofoil to drive the glider at low speeds when the hull is level and supported by displacement and the main wing tips (not shown) are partly immersed;

FIG. 12 is a veiw similar to FIG. 11 but showing the principal force and velocity vectors that drive the glider at high surface speed when the hull is supported clear of the surface by lift of the main wing (not shown) and only the hydrofoil is immersed;

FIG. 13 is a front elevational view of the glider in tilted position showing wheels for gliding along the ground substituted for the hydrofoil and added behind the hull step and at both of the wing tip pontoons;

FIG. 13A is a side elevational view thereof;

FIG. 14 is a view similar to FIG. 13 but with combination skis and ice skates substituted for the wheels for glider movement along the surface of snow and ice;

FIG. 14A is a side elevational view thereof;

FIG. 15 is a diagrammatic plan view of the various controls for the amphibious glider;

FIG. 16 is a side elevational view in gliding trim of an alternate configuration of the amphibious glider comprising the present invention;

FIG. 16A is a front elevational view thereof in tilted position on the surface of the water;
FIG. 16B is a side elevational view thereof;
FIG. 16C is a top plan view thereof;
FIG. 17 is a front elevational view in gliding trim of another embodiment of the invention;
FIG. 17A is a top plan view thereof;
FIG. 17B is a side elevational view thereof;
FIG. 18 is a front elevational view thereof in tilted position on the surface of the water;
FIG. 18A is a side elevational view thereof;
FIG. 18B is a top plan view thereof;
FIG. 19 is a front elevational view in gliding trim of a further embodiment of the invention;
FIG. 19A is a side elevational view thereof;
FIG. 19B is a top plan view thereof;
FIG. 20 is a front elevational tilted view thereof on the surface of the water;
FIG. 20A is a side elevational view thereof; and
FIG. 20B is a top plan view thereof.

Description of Preferred Embodiment

Figure 1:
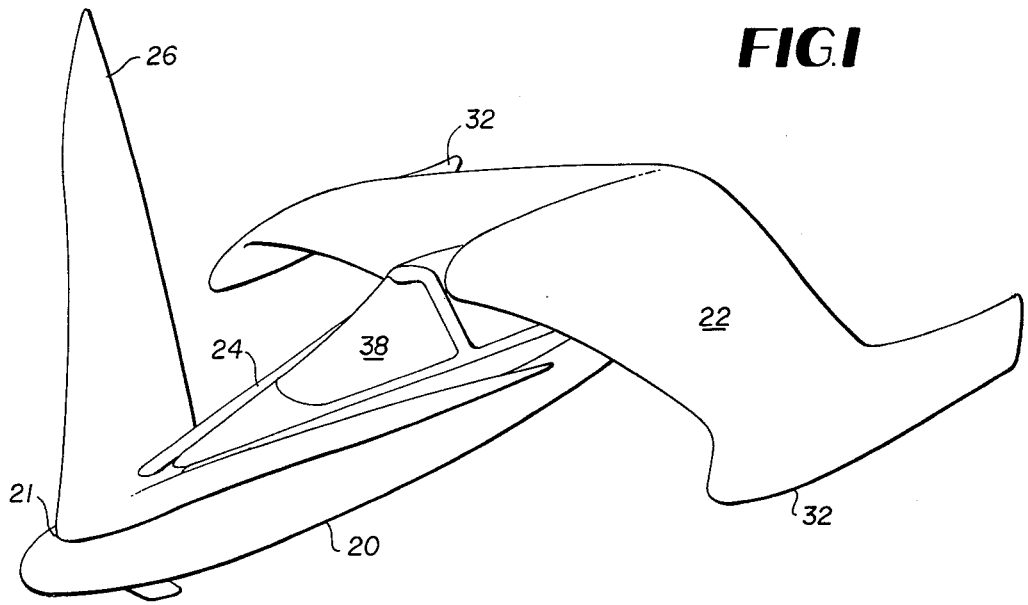
FIG. 1 is a left front perspective view of the amphibious glider comprising the present invention shown in soaring trim.

Referring to the drawings and particularly to FIGS. 1 to 4, the amphibious glider comprising the present invention includes a fuselage type displacement hull 20 for one or more semi-reclining pilot occupants, a main wing 22 pivotally mounted by wing pylons 23¹ on the aft ends of a pair of tubular booms 24 which extend forwardly and are fixed to a high dihedral canard wing 26 which is pivotally mounted to the bow of the hull 20 as at 21, and a hydrofoil foot 28 which is pivotally mounted on the bottom of the hull and may be moved to the inactive dotted line position shown in FIG. 1C or rotated about its vertical axis to act as a rudder. The hydrofoil 30 is rotatable about a horizontal axis with respect to its foot 28 to control its depth of immersion.

The canard and main wings include lateral control members to be described and the ends of the main wing tips are swept back and project downwardly and form integral pontoons 32 which act as stabilizers and which develop keel forces as will be shown. The wings are manually tilted upwardly about their pivot 21 by means of linkage 34 and 36 and in non-pivoted position, these are folded and latched along the sides of the hull 20. A transparent canopy 38 for the pilot is mounted on the link 36. Retraction of the wings to the non-pivoted position is effected by a system shown in FIG. 8 comprised of flexible cables 41, pulleys 42, secured to the hull 20 by a sling 43 as at 44 and operated by harness 40 worn by the pilot when he leans forcefully rearward into a reclining position.

It will be appreciated that the impact stresses with the water surface are substantial and that normal wing structure would involve severe weight penalties. Accordingly, as shown in FIGS. 9 – 9D and 10, an inflatable wing structure is provided for both wings which is light in weight, compresses on impact without permanent deformation, acts as shock absorbing protection for the pilot, may provide emergency floatation, and may be deflated and dismantled for storage and transport. The inflatable wings 22 and 26 are provided with a replaceable plastic film cover 46.

As shown in FIG. 9, the wings are built of uniformly tapered tubes 48 and contoured rib pillows at the center 52, shoulders 54 and tips 32. Only the leading edge tube 56 is curved to support the leading edge wing surface with least stress. The tubes are bonded along their contact surfaces for rigidity, and holes (not shown) interconnect certain of the air passages at these contact surfaces thus making the entire structure an integral bladder assembly comprising one or more redundant structural systems, each having full load capability. Additional reinforcing (not shown) may be provided with ribs and envelopes. The material is commercial polyester film and may be laminated in high stress areas to preserve flexibility and fatigue life when deflated.

A spring loaded bellows chamber 58 serves as a pressure indicator, reservoir and vent just aft of the spar tubes 48. Inflated rollers 60 turned by pulling the control cables 61 impart the cam action for push rods 62 used to deflect the batten ribs 67 that support the lower surface 66 of the wing for lift control as shown in FIGS. 9 and 9B. This lower wing surface divides from the upper surface along the wing traling edge and otherwise comprises a continuous and separate replaceable covering 46 of the same type polyester film and is retained in position on the wings by a system of lacing and buttons (not shown) to adjust strain in the surface. As also shown in FIG. 9B, cables 68 control the pivoting of the main wing 22 on their pylons 23¹ on the booms 24.

The canard wing 26 is similar to the main wing 22 although lift control requires greater flap area and this is provided by slitting the lower covering as at 70 (FIG. 1C). The trailing edge of this flap 72 is moved downwardly by a horn bladder 73 (FIG. 15) instead of push rods 62 and battens 67 as in the main wing and by a roller assembly 71 similar to that of the main wing 22. Differential use of the canard flaps (deflection of only one flap) for turns while soaring combines roll, pitch and yaw forces coordinated because of the dihedral angle, while simultaneous use of the flaps 72 provides pitch forces to climb. Steady gliding flight is optimized by differential use of main and canard flaps to maintain an angle of attack for the largest ratio of lift-to-drag.

As shown in FIGS. 13 and 13A, wheels (the forward one 74 being steerable) are substituted for the hydrofoil and are added behind the hull step as at 75 and at both wing tip pontoons as at 77 for gliding along the ground. Similarly, in FIGS. 14 and 14A, combined skis 76 and ice skates 78 are substituted for the wheels for gliding movement along the surface of snow and ice. The forwardly mounted ice skates and skis are steerable and both center line skis have duplex surfaces for tilting onto either wing tip. On snow, the skate edge 78 penetrates the surface and develops "keel" forces to react sail forces on the wings 22 and 26.

GLIDER CONTROL SYSTEM

The interconnection and general arrangement of cables, pedals, etc. for actuating the aerodynamic control surfaces is disclosed in FIG. 15 in which the canard 26 and main wings 22 are shown in dotted outline to distinguish the surface connection. Some of the various cables terminate at schematic representations of the inflated cam rollers 60 and control horns 73.

In the center of the figure are shown the hand controls which comprise a two fisted baton 80 suspended from the interior ends of the control cables 82 and 96 and in both suspension loops are tension springs 84 with adjustable center anchors 86 that provide control surface trim in flight.

Foot pedal controls 88 for the hydrofoil 30 are shown at the bottom of FIG. 15 and at the left thereof is shown the vertical element 28 of the hydrofoil which retracts by pivoting forwardly (FIG. 1C) with interconnecting cables 90 (FIG. 15) which also take up the slack in the alternate canard control by the foot pedals 88.

All of the controls are shown in their neutral position with arrows to indicate their motion to initiate the basic maneuvers. A centerline 92 across the upper edge of FIG. 15 represents the hinge line 21 around which the wing assembly pivots when being raised or retracted. Pulleys 94 fixed at this common hinge line 92 minimize cable slack as the geometry of the amphibious glider is changed from "surface" to "soar" and the hydrofoil retraction pulley 95 is included in this group for structural convenience.

As shown at a, FIG. 15, the surface trim anchors 86 may be left free in which condition the tension springs 84 serve only to return the controls to neutral and keep the cables from tangling. As shown at b, the hand controls are neutral when the baton 80 is centered, the cables around the quadrangle suspension system are equalized and the tension springs 84 are relaxed.

If the baton 80 is pulled aft (downwardly as shown in FIG. 15), the spring 84 in the inner cable loop 96 will stretch, both cable control leads 98 to the canard flaps 72 will be pulled around their pulleys 94, both canard flaps 72 will deflect and the increase of lift forward will produce a climb. The same movement of the baton (aft) fully relaxes the spring 84 in the outer loop 100 which takes up slack across the idle span without action at the main wing flaps 66.

If at the same time that the baton 8C is pulled aft, it is swung clockwise (by releasing the left end), all movement of the control cable loops is confined to pulling the right canard flap control lead 96 around its adjacent pulley, the flap will deflect and the glider will both bank and turn left. The surface trim control can be used to hold the baton 80 in this position to compensate for imbalance in the lateral distribution of weight or lift by latching the centers of the tension springs 84 at their displaced positions by means of their adjustable anchors 86. The springs can be overriden by the baton while thus trimmed.

The reverse motion of the baton 80 reverses the control action, that is pulling only on the left end causes turn and bank to the right and pushing the baton uniformly forward will deflect both main wing flaps 66 and cause a dive. Diagonally opposite control surfaces, that is, the right canard flap 72 and the left main wing flap 66 are deflected together by rotating the baton 80 around its neutral position. Lifting the baton operates all surfaces.

The foot controls shown at c, FIG. 15, primarily for control of the hydrofoils 28 and 30, comprise a pair of pedals 88 mounted on a bar having an off-center crank arm 89 connected to the hydrofoil 30 by push rods (not shown). The pedal bar is supported in bushings 91 mounted on the shaft 105 of the vertical hydrofoil 28 which is swung to right or left by alternating the force on the pedals 88. Slack cables 102 are shown connecting the ends of the pedal bar to the canard control loop 96 through take-up pulleys that remove slack when the hydrofoil 28 is retracted.

The foot pedals 88 then provide an alternate control path for the canard flaps 72, being capable of overriding the hand control of the canard flaps but not preventing hand control of the main flaps 66. As shown at d, the vertical hydrofoil 28 includes a hinge 106 on the shaft 105, a crank arm 108, a differential pulley 110 to maintain cable tension, and a self locking cable grip 112 which is connected to the leads from the take-up pulleys of the foot control c. The retraction hinge 106 also acts as a release operated by the initial motion to retract which frees the vertical foil 28 to trail into a fore and aft direction while the pedals 88 are used for canard flap control.

OPERATION

In the following surface maneuvers and control positions, the wind forces and water forces react to drive the amphibious glider forward in the direction of heating except when heading closer than 15 degrees toward the wind. It will be appreciated that because the glider is symmetrical, the following sequence of right and left maneuvers arbitrarily selected for this description can be completely reversed.

Referring to FIGS. 5, 6 and 7 with the glider in tilted position on its left side and balanced by buoyant force upward on the immersed left main wing tip 32 functioning as a pontoon and as a keel, the foil deflections (direction applies to the leading edge) for all possible surface maneuvers are as follows:

| a. | Pitch down | a. | Horizontal foil 30 down and vertical foil 28 left |
| b. | Pitch up | b. | Horizontal foil 30 up and vertical foil 28 right |
| c. | Steer left | c. | Vertical foil 28 left and horizontal foil 30 up |
| d. | Steer right | d. | Vertical foil 28 right and horizontal foil 30 down |

Assume that the wing is raised and the cockpit canopy 38 is open for entering and leaving the craft and the wind is coming toward it from the forward right hand quarter as for a sailboat on a starboard tack. This wind direction B is shown in FIG. 7 at about 40° from the heading C of the glider and at this heading, it is shown that all aerodynamic controls are neutral. This configuration is intended for operation at low wind speeds, or for low surface speeds as when maneuvering around a sheltered mooring or dock.

When the wind direction relative to heading is much less than 40°, headway may be sustained by deflecting the right canard flap 72 (this wing is nearly upright) and both main wing flaps 66 with the effect also of increasing main wing lift force. When the wind direction is from more than 40° off the heading, the aerodynamic controls remain neutral and approach stall which sacrifices some of the potential driving power of the wind but increases the side force. When the wind blows from the side, gusts have a strong upsetting effect and maneuvers around the mooring should consist mostly of windward and leeward legs with only brief legs abeam the wind.

When changing tack (to take wind from the opposite side), the tilt of the glider must be reversed and this is best accomplished in the brief period when the glider is headed due upwind when the flap 66 on the down wing will be extended to start lifting that side. The glider is "flown" over to the opposite tilt, passing momentarily through the configuration shown in FIG. 4. When on the opposite or port tack (wind coming from the forward left quarter), the use of the vertical foil 28 in pitch control reverses as does the use of the horizontal foil 30 in steering control.

A trip in the glider would preferably begin at a selected location for take-off which is free of obstacles but near to a land feature that would cause updrafts. The craft is headed 40° off the wind, the angle shown between B and C in FIG. 7. A gradual turn is made as the glider accelerates using control actions set forth above in the table of hydrofoil deflections and should be headed about 70° to the true wind (still 40° off the direction of the relative or apparent wind) when the surface speed of the glider is about equal to half the true wind speed.

As the glider accelerates, the operator will sense the lifting of the hull and should lift the bow with the hydrofoil control to keep the hull level in the fore and aft direction while keeping the hydrofoil immersed. The main wing flaps 66 are deflected as required to control roll and keep the left wing tip in the water (acting as a keel) while the hull is lifting. As the hull 20 lifts clear of the water, speeds will be approaching a peak and the operator will prepare to change to the gliding configuration of FIGS. 1C, 2 and 3 which will require a change of control coordination as the glider becomes level.

With reference to FIGS. 1C, 2, 3 and 12, the hydrofoil deflection (direction applies to leading edge) for surface maneuvers in level attitude is as follows:

| | | | |
|---|---|---|---|
| e. | Pitch down | e. | Horizontal foil 30 down |
| f. | Pitch up | f. | Horizontal foil 30 up |
| g. | Steer left | g. | Horizontal foil 28 left |
| h. | Steer right | h. | Vertical foil 28 right |

As shown, the glider is level and supported, stabilized, and controlled by a balance of dynamic forces acting on the wings and the hydrofoil (which is the only part of the glider running beneath the surface of the water 59). The glider is balanced when the right canard wing flap 72 and the left main wing flap 66 are fully deflected and the vertical hydrofoil is hard over to the left at 30° and steering a course that is about 40° off the relative wind (coming from the right forward quarter) as shown in FIG. 12.

The operator converts to the level configuration from the tilted by leaning backwardly down into the cockpit. Through the tension in the cables 41 of the retract system shown in FIG. 8, the canopy linkage 34, 36 to the booms 24 that supports the wings is collapsed, folded and latched in the wings retracted position. As the wings are retracting, the angle of attack to the relative wind given as A in FIG. 7 initially increases but as the tilt diminishes, the side force and roll moment decrease and the pontoon 32 at the left wing tip will lift out of the water and will lose its keel effect allowing the glider to weathervane into the wind and the angle of attack will decrease and minimize drag. Lift becomes greater on the low wing by "surface effect", as will be explained, and produces strong wing leveling moments without intentional control.

The operator coordinates deflection of the right canard wing flap 72 to maintain driving force during weathervaning and extends the left main wing flap 66 as required to balance the rolling force couple generated between the canard wing 26 and the hydrofoil 28. The main wing angle of attack is established automatically during retraction, by the paying out of cables 68 to the aft ends of the wing pylons 23¹ (FIG. 9A). The cable travel for this control is established between hull attachments and pulleys in the booms 24 that support the wings at a point immediately aft of the common hinge 21.

FIG. 12 shows force and velocity vector diagrams of the hydrofoil 28 and the canard wing 26 with the latter schematically showing the wing cross-sections in dotted lines 25 at the mean chord locations. The right flap 72 is shown fully deflected to generate the maximum driving force from the available wind which acts to the left and causes the glider to drift along a yaw angle (about 2°) off the course steered by the vertical hydrofoil 28. The latter being left at 30°, the true surface speed vector 27 will be 32° off the centerline of the glider to the left. The true surface speed vector 27 is shown projected from the end of the true wind vector 29 to develop the relative wind vector 31 shown acting 5° off the centerline of the glider at the aerodynamic center 33 of the canard wing 26.

The true surface speed vector 27 therefore shown 37° off the relative wind 31 when the surface speed is 75% of the true wind speed — an example of exactly optimum driving conditions. The relative wind vector 31 is projected on both the right and left canard wing sections 25 to show the angle of attack A from which the lift and drag forces of the canard wings are estimated and combined at their aerodynamic center 33 (lift 35 shown perpendicular to the relative wind — drag 37 shown parallel) and resolved into the aerodynamic force resultant 39.

Only the horizontal components of the lift, drag and the resultant forces are shown in FIG. 12. The full force 47 of the vertical hydrofoil is horizontal, equal and opposite to the canard resultant 39 and this force is shown resolved into "lift" 49 and drag 51 respectively perpendicular and parallel to the true surface speed vector 27 and acting at the hydrodynamic center 53. At subcavitating but high surface speeds, the "lift force" is accompanied by a relatively low drag force leaving a significant force component 55 for acceleration in this mode of operation. As the glider accelerates and approaches hydrofoil cavitation, this drag force increases in proportion and equals the drive force at equilibrium (and take-off) speed.

In high wind, the glider can be launched starting from slow surface speed while in the gliding configuration (wings 22 retracted, canopy 38 closed and linkage 34 and 36 latched to the hull 20) as shown in FIG. 1C. The extreme tips of the main wing pontoons 32 pierce the water surface 57 at low surface speeds and act as keels to keep the stern of the glider on the heading steered by the hydrofoil 28. The glider remains level in the water when headed across the wind to develop propulsion force as shown in FIG. 11. The drift of the true surface speed vector 27 at low speed is shown at a yaw angle of about 10° to the chord plane of the vertical hydrofoil 28 and is about 33° across the relative wind 31. Estimated forces of "lift" 35 and drag 37 on the canard wings are combined at their aerodynamic center 33 and resolved into a resultant force 39 shown also acting on the hydrofoil 28 which develops an equal and opposite hydrodynamic force 47 as the glider accelerates.

Plotted around the aerodynamic center 33 are the other force vectors that result from the same wind speed acting at different headings (wind vectors are shown projected from the ends of their respective force vectors). At a heading 15° across the relative wind, as at 53, the force resultant 55 is shown acting perpendicularly to the water course 27 without a component in the drive direction to sustain motion. It is similarly shown that wind abeam will not sustain motion and that forward propulsion in this configuration requires a cross wind heading between 15° and 90°.

As surface speed increases, the relative wind increases and acts to tilt the main wing with the hull latched on. By roll control (deflecting either main wing flap 66) the left main wing tip 32 is kept down and piercing the water surface until the hull rises to ride on the step 23 and thus losing wave drag, accelerates to a speed sufficient to begin gliding on the hydrofoil as described above for FIGS. 1C and 12. As shown in FIG. 1C, the wing tip pontoons 32 descend close to the water surface 59 to enhance the "surface effect" of the main wing 22, which is the reduction of drag force and the increase of lift experienced when a wing clears the surface by a height less than the wing chord dimension. The glider may be operated indefinitely in this mode (within wave size limits) or pulled up free of the surface and into the wind to initiate wind shear soaring.

Take-off is initiated by deflecting the horizontal hydrofoil 30 upwardly and as the vertical foil clears the surface neutralizing these control surfaces. The operator then deflects the left canard wing flap 72 to initiate a climbing turn to the right and into the wind. To soar in wind shear, the operator continues this climbing turn. If the take-off is aborted, the operator levels off when the glider is headed into the true wind, begins a gliding descent (pitching down by deflecting both main wing flaps 66), and retracts the hydrofoil as shown in FIG. 1.

Approaching the water, the glider is leveled (pitching up by deflecting both of the canard wing flaps 72) and held in a level attitude until flying speed is lost — at which time the nose is pitched up to land the craft on the step 23 of the hull 20. The glider is then steered into the wind with the canard wing flaps 72 until it loses way.

Figure 1A:
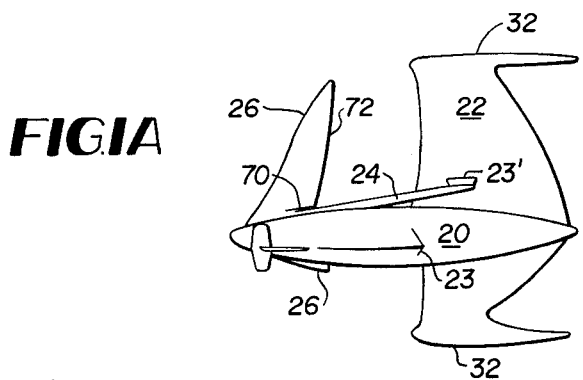
FIG. 1A is a bottom perspective view thereof showing the hydrofoil retracted.
Figure 1B:
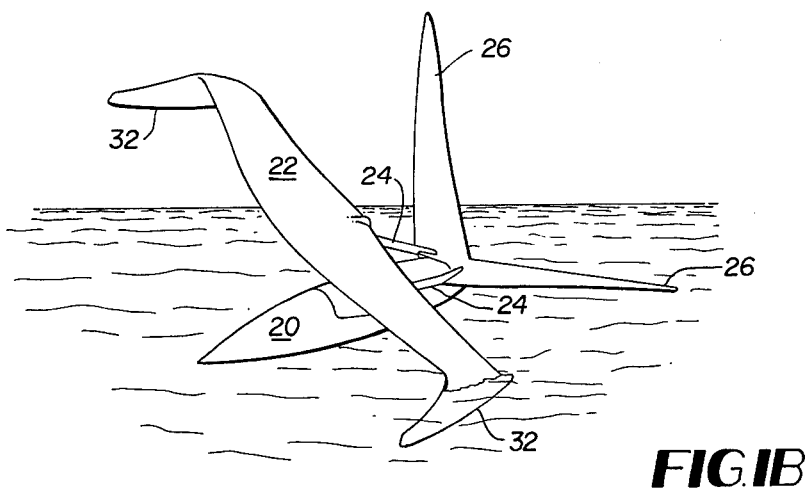
FIG. 1B is a right rear perspective view with the wings raised and the glider tilted on the water surface showing the stabilizing effect on one of the wing tip pontoons in the water.

With reference to FIGS. 1 and 1A, the following table indicates the position of the aerodynamic control surfaces during flying maneuvers.

| i. | Climb | i. | Extend canard flaps 72, left and right together |
| j. | Dive | j. | Extend main wing flaps 66, left and right together |
| k. | Bank and Turn Left | k. | Extend right canard flap 72 |
| l. | Bank and Turn Right | l. | Extend left canard flap 72 |

The above control movements are coordinated to glide and soar in updrafts and in wind shear effects as will be explained.

The energy required to soar at low altitudes is provided with the increase in wind velocity with increasing height above the surface of the water. For example, between 5 and 50 feet, the wind velocity will increase over 40% (or more than 8 miles per hour when the surface wind at take-off is 20 miles per hour). This increase is commonly called "wind shear" because one strata of air shears past adjacent air strata slowed by ground surface resistance to the wind. When an aircraft climbs toward the wind in stratas of faster moving air, the difference in wind velocity is added to its air speed. Similarly, when an aircraft dives with the wind into stratas of slower moving air, it tends to overrun the lower mass of air and the difference in wind velocity is again added to its air speed.

In still air, a gliding aircraft may climb briefly on its momentum, trading air speed for altitude. The kinetic energy of motion is thus converted into the potential energy of height (minus losses that depend on the rate of descent during equivalent steady state gliding flight). In strong wind, when a gliding aircraft is climbing thusly toward the wind, the wind shear velocity increment will be added to its air speed to restore losses of air speed resulting from the climb (but leaving the aircraft almost motionless with respect to the ground).

After turning through 180° (to aim with the wind) at the peak of the climb, the glider is ready to dive down wind and acquire another increment of wind shear to its air speed. Another turn through 180° at the base of the dive establishes the same heading as at the start, toward the wind and from a position downwind from the start. The cycle of maneuvers is closed by a glide to the starting location or slightly above depending on the strength of the wind and the efficiency of the glider. By repeating the maneuver cycles, the glider can spiral upwardly on wind shear effects. Because the effectiveness of wind shear to power the glider diminishes with increasing altitude, to soar above a few hundred feet requires use of up-drafts and thermals.

The embodiments of the invention disclosed in FIGS. 16 through 20B are alternate configurations which lack some of the automatic stabilizing features hereinbefore described. In the order of the figure numbers, the embodiments are progressively simpler to build and less costly but they progressively require higher proficiency in the operator.

Referring now to FIGS. 16, 16A, 16B and 16C which disclose a canard wing aircraft, numeral 120 designates the fuselage to which the main wing 122 with its pontoon wing tips 121 is fixed, the forward end of the fuselage having a gimbal attachment at 123 to a pontoon 124 which terminates aft in a pair of hydrofoil keels 126. The canard wing 128 is rigidly fixed to the upper surface of the pontoon 124. The gimbal 123 has two pivoting axes, one horizontal and one nearly vertical which permits the forward tip of the pontoon to be moved up, down and sideways but the pontoon cannot rotate with respect to the longitudinal axis of the fuselage 120. This gimbal connection is also common to the disclosures of FIGS. 17B and 19A. Controls in the watertight but stepless fuselage 120 extend through the gimbal 123 to allow the pontoon 124 to be aimed up, down, or to either side for full aerodynamic control by direct position of the forward lift and control surfaces 128. At low speeds on the surface, the craft is steered with the hydrofoil keels 126 and maneuvered after the manner of FIG. 11 to gain propulsion until the increase of relative wind and resulting lift of the main wing 122 raises the hull 120 clear of the surface as shown in FIGS. 16A – 16C.

It will be noted in FIGS. 16 and 16B that the pontoon wing tips 121 are longer and less sweep back and their leading edges are straight to improve longitudinal stability when the wing and fuselage are raised and tilted. The height of the raised fuselage is coordinated with the span of the wing so that the resulting inclination of the wing establishes the main wing angle of attack to the relative wind that optimizes power extraction (heading about 70° off the true wind) when the angle of attack is determined by the direction of the chord in horizontal sections through the raised and tilted main wing. By position on the pontoon 124, the upward pointing canard wing 128 is at this same optimized angle of attack when the direction of the downward pontoon foil 126 coincides with the direction of the main wing tip keel pontoon 121, the other foil 126 being horizontal on the surface of the water. The various vectors are shown in FIG. 16C in the manner of FIG. 7. The provision to drive to take off speed after the manner of FIG. 7 but with the hull lifted clear of the surface is also common to the remaining disclosures.

Referring now to FIGS. 17, 17A and 17B which disclose a glider having a conventional arrangement of main wing 122 in the forward position, the main wing tips 121 extend less abruptly downwardly in the front view of FIG. 17 and are swept back less sharply to contribute lift. The wing tips 121 have ailerons 130 for roll control and the fuselage terminates aft in conventional empennage 132 for lateral and longitudinal control. The fuselage is pivoted to the pontoon 124 as earlier stated but the pontoon is only provided with laterally extending sets of V shaped hydrofoils 134. At low speed on the surface, the craft is steered with the pontoon 124 and maneuvered after the manner of FIG. 11 to gain propulsion until the increase of relative wind and resulting lift of the main wing 122 and empennage 132 raises the hull 120 clear of the surface as shown in FIGS. 18, 18A and 18b.

The uplift of fuselage and wing is here combined with rotation of about 45° around the lateral or yaw axis of the glider which aims the aerodynamic lift vector acting along this axis in the same direction as previously stated for FIG. 7. The resulting increased height of fuselage elevation is coordinated with the wing tip angles to provide static stability when so raised and when the main wing angle of attack to the relative wind optimizes power extraction. The uplifted wing tip 121 is at about zero angle of attack to the relative wind which allows full effectiveness of the aileron 130 to dynamically stabilize the glider in this attitude. The main wing plane is nearly vertical but with the raised tip considerably advanced into the wind as seen in the plan view of FIG. 18B and it is these vertical surfaces which act like sails (of unusual plan form) to accelerate the craft.

With the up tilted glider on a water course determined by the direction of the immersed wing tip pontoon 121 functioning as a keel, the downward set of hydrofoils 134 from the pontoon 124 provide significant lateral surface for steering and sufficient horizontal surface to control separation of the pontoon from the water surface.

The consequences of rigidly interconnecting wing and fuselage are that the operator is lying on his side and facing slightly downward and that the uptilted aft end of the fuselage increases wind resistance. But by this means also, the center of gravity of the glider is raised considerably before take-off, and that maneuver now consists of rolling the aircraft into a level high speed glider skimming the surface using aerodynamic control surfaces coordinated with the steering of the pontoon hydrofoils sharply into the wind and then up off the surface.

Referring now to FIGS. 19, 19A and 19B, it will be seen that in this "flying wing" embodiment, the empennage 132 has been eliminated and the wing surface broadened and provided at its trailing edge with bidirectional flaps 136 to change pitching moment of the amphibious glider by reflexing the curvature of the airfoil. The forward pontoon 124 is provided with a vertical symmetrical airfoil 138 to provide lateral control while gliding and with sideward projecting hydrofoils 134 which also assist longitudinal control while gliding. Flight is otherwise similar to the performance of the glider of FIGS. 17, 17A and 17B as stated previously.

On the surface as illustrated by FIG. 20, 20A and 20 operation through take-off is similar to the glider of FIGS. 18, 18A and 18B as stated previously.

It is to be understood that the forms of my invention herewith shown and described are to be taken as preferred examples of the same and that various changes in the shape, size, and arrangement of parts may be resorted to without departure from the spirit of the invention or the scope of the subjoined claims.

I claim:

1. An amphibious glider comprising, in combination, a fuselage type displacement hull having a cockpit positioned at the center of gravity of said glider; a canard wing pivoted to the bow of said hull; a pair of laterally spaced booms fixed to said canard wing and extending rearwardly thereof; and a main wing for developing aerodynamic lift pivoted to the aft ends of said boom behind said cockpit.

2. The combination recited in claim 1 wherein said hull has a sufficient gunwale clearance to accommodate a 40° roll thereof.

3. The combination recited in claim 1 wherein at least one of said wings is inflatable.

4. The combination recited in claim 1 wherein said displacement hull is provided with a step.

5. The combination recited in claim 1 wherein a hydrofoil is positioned on the bottom of said hull to give it lift in operative position.

6. The combination recited in claim 5 wherein said hydrofoil is pivotable to an inoperative position against the bottom of said hull.

7. The combination recited in claim 5 wherein said hydrofoil is rotatable about a vertical axis to act as a rudder.

8. The combination recited in claim 1 wherein the tips of said main wing are downwardly inclined to act as keels when one is immersed in the water.

9. The combination recited in claim 1 wherein the tips of said main wing are downwardly inclined to act as stablizing pontoons.

10. The combination recited in claim 1; a steerable wheel mounted on the bottom of the bow of said hull; and a depending wheel mounted in the tips of said main wing and in the aft end of said hull to function with said steerable wheel as a support for the glider on the ground.

11. The combination recited in claim 1; a steerable combination ice skate and ski mounted on the bottom of the bow of said hull; and a depending combination ice skate and ski mounted in the tips of said main wing and in the aft end of said hull to function with said steerable ice skate and ski as a support for the glider on ice and snow.

12. The combination recited in claim 1; and control means for varying the angle of said canard wing.

13. The combination recited in claim 1; and control means for varying the angle of said main wing.

14. An amphibious glider, operable in both a surface mode and capable of self-launching into a gliding mode, comprising, a displacement hull;

an aerodynamic wing mounted on said displacement hull, said aerodynamic wing being capable of acting as a sail upon tilting said glider when operating in said surface mode, said aerodynamic wing further including means for stabilizing said glider when operating in said surface mode, said means for stabilizing said glider disposed at the ends of said aerodynamic wing and being capable of developing keel forces upon insertion of said means into water for counteracting the forces on said aerodynamic wing when said aerodynamic wing is acting as a sail; and a hydrofoil mounted with respect to said hull, said hydrofoil being capable of hydrodynamic direction control.

15. The amphibious glider of claim 14 wherein the combination of said displacement hull and said means for stabilizing said glider disposed at the end of said aerodynamic wing are sufficiently buoyant to maintain said glider afloat upon its immersion in water.

16. The amphibious glider of claim 14 wherein said means disposed at the ends of said aerodynamic wing comprises wing tip pontoons inergral with said wing.

17. The amphibious glider of claim 14 including a canard wing disposed forward of said aerodynamic wing, and pivotally mounted with respect to said displacement hull.

18. The amphibious glider of claim 17 wherein said canard wing is a high dihedral canard wing.

19. The amphibious glider of claim 14 wherein said hydrofoil is pivotally mounted with respect to said displacement hull.

20. The amphibious glider of claim 14 wherein said hydrofoil is pivotally mounted upon a hydrofoil foot, and is rotatable about a horizontal axis with respect thereto.

21. The amphibious glider of claim 14, including a pontoon pivotally attached to the forward portion of said displacement hull.

22. The amphibious glider of claim 21, including a canard wing mounted on said pontoon.

23. Th amphibious glider of claim 22 wherein said hydrofoil is mounted on said pontoon.

24. The amphibious glider of claim 14 wherein said aerodynamic wing is inflatable.

25. The amphibious glider of claim 17 wherein said aerodynamic wing and said canard wing are inflatable.

26. An amphibious glider, operable in both a surface mode and capable of self-launching into a gliding mode, and comprising, a fuselage type displacement hull;

an inflatable aerodynamic wing mounted on said displacement hull, said inflatable aerodynamic wing including means disposed at the ends thereof, capable of acting as a keel upon immersion in water; and a hydrofoil mounted with respect to said hull, said hydrofoil being capable of hydrodynamic direction control.

27. The amphibious glider of claim 26 wherein said inflatable aerodynamic wing comprises tubular members for rigidifying said wing upon inflation.

28. The amphibious glider of claim 27 wherein the leading edge of said inflatable aerodynamic wing comprises a curved tubular member.

29. The amphibious glider of claim 26 wherein said inflatable aerodynamic wing comprises polyester film.

30. The aphibious glider of claim 26 including a canard wing disposed forward of said inflatable aerodynamic wing, and pivotal with respect to said displacement hull.

31. The amphibious glider of claim 30 wherein said canard wing is inflatable.

32. An amphibious glider, operable in both a surface mode and capable of self-launching into a gliding mode, comprising, a hull;

an aerodynamic wing mounted on said hull, said aerodynamic wing including means for stabilizing said glider when operating in said surface mode, said means for stabilizing said glider disposed at the ends of said aerodynamic wing; and a hydrofoil mounted with respect to said hull, said hydrofoil being capable of hydrodynamic direction control.

33. A glider, operable in both a surface mode and capable of self-launching into a gliding mode, comprising, a hull;

an aerodynamic wing mounted on said hull, said aerodynamic wing being capable of acting as a sail upon tilting said glider when operating in said surface mode, said aerodynamic wing further including means for stabilizing said glider when operating in said surface mode, said means for stabilizing said glider disposed at the ends of said aerodynamic wing and being capable of developing keel forces when said aerodynamic wing is acting as a sail so that the forces of said aerodynamic wing are counteracted thereby; and means mounted on said hull for steering said glider when operating on said surface mode.

34. The glider of claim 33 wherein said means disposed at the ends of said aerodynamic wing comprises wheels, and said means for steering said glider comprises a wheel mounted beneath the forward portion of said hull, and further wherein said hull includes means for supporting the payload of said glider, comprising a wheel mounted beneath said hull.

35. The glider of claim 33 wherein said means disposed at the ends of said aerodynamic wing comprises a blade for engagement with ice and said means for steering said glider comprises a blade mounted beneath the forward portion of said hull, and further wherein said hull includes means for supporting the payload of said glider comprising a blade mounted beneath said hull.

36. The glider of claim 33 including a canard wing disposed forward of said aerodynamic wing.

37. The glider of claim 36 wherein said canard wing is a high dihedral canard wing.

* * * * *